Dec. 29, 1936.  H. A. WADMAN  2,066,283

METHOD OF AND APPARATUS FOR COOLING HOLLOW GLASS ARTICLES

Filed Nov. 20, 1935  4 Sheets-Sheet 1

Inventor:
Harold A. Wadman
by Brown & Parham
Attorneys

Witness:
W. B. Thayer

Fig. 2.

Dec. 29, 1936.　　　　H. A. WADMAN　　　　2,066,283
METHOD OF AND APPARATUS FOR COOLING HOLLOW GLASS ARTICLES
Filed Nov. 20, 1935　　　4 Sheets-Sheet 3

Witness:
W. B. Thayer.

Inventor:
Harold A. Wadman
by Brown & Parham
Attorneys

Patented Dec. 29, 1936

2,066,283

UNITED STATES PATENT OFFICE 2,066,283

METHOD OF AND APPARATUS FOR COOLING HOLLOW GLASS ARTICLES

Harold A. Wadman, Bloomfield, Conn., assignor to Hartford-Empire Company, Hartford, Conn., a corporation of Delaware Application November 20, 1935, Serial No. 50,684

30 Claims. (Cl. 49—47)

This invention relates to a method of and apparatus for cooling hollow glass articles, and more particularly to such a method and apparatus including the cooling or positive abstraction of heat from the insides of the articles at a predetermined rate or in predetermined degree to the end that the rates of cooling of the insides and outsides of the articles may be coordinated, so that when the articles are finally cooled, there will exist therein such conditions of strain, and particularly such distribution of strain that the articles will have the desired strain characteristics.

In all prior practices of annealing hollow glass articles as far as is known, the heat has been extracted or dissipated slowly from the outside through the walls of the articles. This has resulted in the more rapid cooling of the outsides than of the insides, so that the outsides of articles are usually under more or less compressive strain while the insides are under a certain amount of tensile strain. This condition has been a desired condition from a certain point of view, for example, when glass articles are to be filled with hot material, as the heat applied more rapidly to the inside than the outside causes the inside portions of the walls to heat first and consequently to expand, which tends under the conditions existing as aforesaid to relieve a part or all of the tension, or in any case to change the strains in a way opposite to the initial inequality of strain. However, there are instances where it may be desired that articles have a different distribution of strain, for example so as to produce a condition where the inside and outside are more nearly equally strained or where the reverse condition exists from that above referred to. Heretofore there have been no practical methods or apparatus available for attaining a desired distribution of strain between the insides and outsides of the articles. The provision of such a method and of apparatus to attain this result is one of the objects of the present invention.

Also, if all the heat from the walls of a glass article must be extracted from the outside as in the prior art practices, a certain time factor must be taken into consideration in planning the time allotted to the annealing operation in attaining a desired result, due to the fact that the rate of conductivity through glass is relatively slow and becomes progressively slower as the article cools. If, however, the heat be extracted from both the inside and outside of an article simultaneously, as is contemplated by the present invention, the rate of annealing to attain a given average result may be appreciably speeded up, so that the time which must be provided for the annealing of an article may be cut theoretically to one-quarter of that which is used when prior art practices are employed. The provision of a method and apparatus for accomplishing this more rapid annealing are further objects of the present invention.

Among the further and more detailed objects of the invention are the following:

1. To provide a method and apparatus for the passing of a gaseous cooling medium such as air into and out of the inside of a hollow glass article during the annealing thereof for abstracting heat from inside independently of the rate of heat extraction or dissipation from the outside and more particularly to carry on this same cooling of the inside while protecting the neck portion of the article from excessive cooling.

2. To provide for the circulation of air through the inside of an article as aforesaid by withdrawing air from the inside while leaving an opening at the neck of the article to the atmosphere for the inflow of air therefrom to replace that which is withdrawn from the inside of the article.

3. To cause a flow of air into and out of an article as aforesaid while controlling the rate of heat dissipation from the outside.

4. To provide an alternatively usable method and apparatus for cooling the inside of an article independently of the outside by injecting thereinto a stream of a relatively volatile liquid, such for example as water, preferably in such manner and under such pressure that the stream will feather before it comes in contact with the interior walls of the article.

5. To control adjustably the amount of the volatile liquid injected into the inside of an article when practicing the method or using the apparatus of paragraph 4 hereinabove.

6. To provide a practical automatic apparatus for accommodating bottles or other hollow glass articles of varying sizes and shapes in the carrying out of the internal cooling by either a cooling gas circulation or the use of a volatile liquid as aforesaid.

Other and more detailed objects of the present invention will become apparent from the following specification and appended claims when taken in connection with the accompanying drawings, in which:

In the accompanying drawings, I have shown two forms of my invention, one shown in Figs. 1 to 5 inclusive illustrating a possible application of the invention to the cooling of hollow blown glass articles internally by passing air into and out of such articles, and the other shown in Figs. 6 to 9 inclusive, illustrating the internal cooling of glass articles by injecting a stream of a relatively volatile liquid into the articles under high pressure.

It will be understood that while both embodiments of my invention illustrated in the accompanying drawings show circular type annealing apparatus including insulated tunnels with heat below in each case, the invention is not limited specifically to the use of a circular type apparatus or even to an insulated tunnel, but from a broad point of view it may be practiced considering the articles even individually and/or with the articles out in open air. The forms of the invention shown are relatively improved constructions and may be considered as preferred forms from my present point of view.

Referring now to Figs. 1 to 5 of the drawings, I have illustrated an annealing apparatus specifically including a substantially circular insulated tunnel through which the articles are passed. This construction is shown as mounted upon a base 1 which may be supported in any suitable manner, as for example by the provision of axles 2 and wheels 3, so that the device as a whole may be moved to a desired part of the plant in which it is to be used.

Mounted upon the base 1 is a substantially annular tunnel forming construction which is U-shaped in cross section, this construction being formed by a shell 4 of suitable material such as sheet metal and filled with some suitable pulverulent insulating material 5 which may in practice be kieselguhr or "Sil-o-cel". This construction includes a bottom wall portion 6, an inner annular side wall portion 7 and an outer substantially annular sidewall portion 8, there being a substantial sized opening in the outer wall portion 8 as shown at 9, Fig. 1, to permit the introduction and removal of the articles to be annealed. The top of the tunnel is formed by a large substantially circular disc-like member 10, the mounting and means for rotating of which will be hereinafter set forth. The top member 10 is constructed of a metallic plate 11 above which is disposed suitable insulating material 12. At its outer periphery the plate 11 is provided with a cylindrical flange portion 13 which may be integral therewith and which extends both above and below the member 11 so as to confine the lateral edges of the insulating material 12 and also to extend down around the outer wall forming portion 8 of the tunnel.

Means are provided for conveying the articles to be annealed through the tunnel constructed as aforesaid. In this instance such means comprise perforated shelves as shown at 14 on which the articles are carried, these shelves being carried by a depending cylindrical shell 15, which may be secured to or integral with the member 11 of the top. The perforations in the shelves 14 permit the free circulation of tunnel atmosphere about all sides of the articles. Thus the articles will always be maintained in a predetermined relation with the top of the tunnel once they have been spotted as hereinafter set forth.

Means are provided for mounting the top 10 and the parts carried thereby for rotation. The member 11, which is the rigid portion of the top 10, is formed integral with or has suitably rigidly secured thereto a vertical sleeve portion 16 which is arranged for rotational movement about a central stationary column 17. The column 17 is suitably stepped as shown at 18 in a socket integral with the base 1. The vertical thrust of the weight of the top 10 and parts carried thereby, including the articles to be annealed and the supports 14 therefor is carried by ball bearings 19 intermediate a lower flange 20 of the sleeve portion 16 and suitable ball bearing raceways 21 carried by the base 1. The sleeve member 16 has bearing portions as shown at 22 and 23 about the central column 17 to guide it for purely rotational movement about the vertical axis of this column. Suitable strengthening webs as shown at 24 extending radially from the sleeve portion 16 and connecting the lower flange 20, the sleeve portion and the rigid part 11 of the top may be provided to impart the necessary strength to the construction.

Secured to the lower flange 20 of the rotatable portion of the apparatus as above described is an annular bevel gear ring 25, this gear ring meshing with a beveled pinion 26 secured to the inner end of a substantially radially arranged shaft 27, which is journaled in bearings formed in brackets 28 and 29 secured to the base 1. At its outer end the shaft 27 is provided with a sprocket wheel 30 which is connected by a suitable sprocket chain 31 with a sprocket (not clearly illustrated) mounted on the end of a power shaft 32. The shaft 32 may be driven in any suitable manner as by power derived by some prime mover (not shown) and transmitted to the shaft through a suitable sprocket chain 33 which passes around a sprocket rigid with the shaft. The shaft 32 is journaled in bearings 34 and 35 which may be formed in brackets secured to the base 1, or to any other suitable part rigid therewith.

Means are provided for conveying the articles to be annealed from the forming machine in which they are shaped and which is not shown in the accompanying drawings, to the annealing apparatus and for moving the articles individually onto and spotting them in place on the supports or shelves 14. For this purpose the articles are brought up to a point closely adjacent to the path of the shelves 14 upon a conveyor or buck generally indicated at 36, which is arranged substantially radially of the path of movement of the shelves 14 and is arranged to move the articles to the vicinity of the shelves through the opening 9 in the outer wall forming member 8. This conveyor is driven from the driving means for the annealing apparatus by a driving drum or sprocket at its inner end best shown in Fig. 2 at 37. This drum or sprocket is mounted upon a shaft 38 which carries a sprocket wheel about which a sprocket chain 39 passes, this sprocket chain also passing around a sprocket on the shaft 32, which is driven as above set forth.

Figure 1:
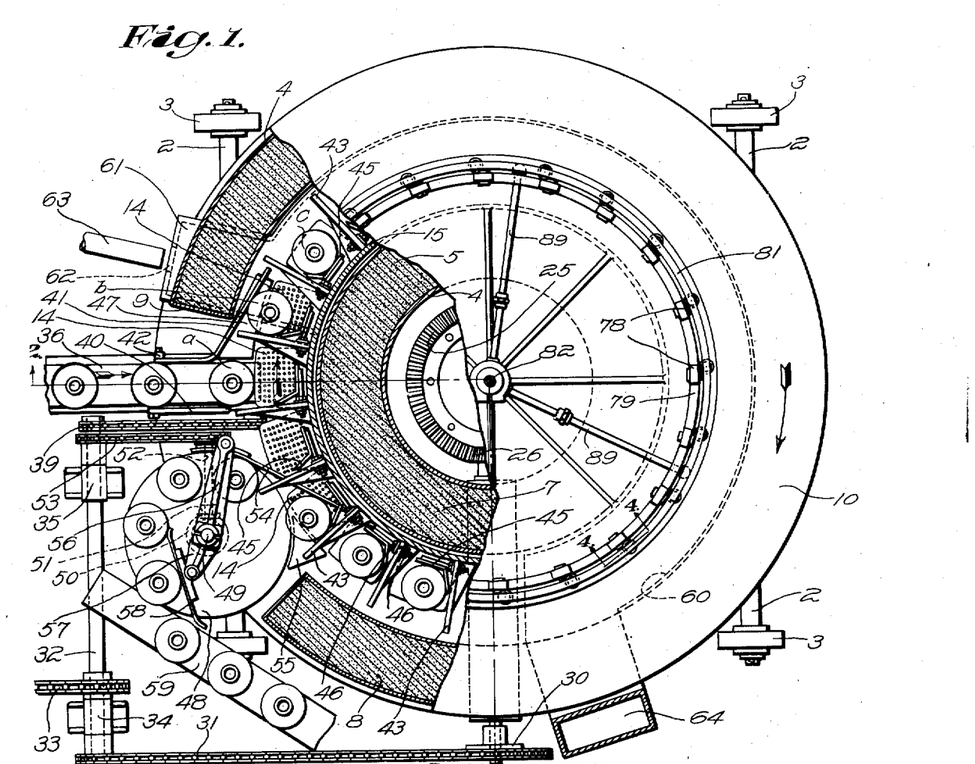
Figure 1 is a plan view with parts broken away and in horizontal section of a device for annealing hollow glass articles by my novel method, specifically by passing air into and out of the articles.
Figure 2:
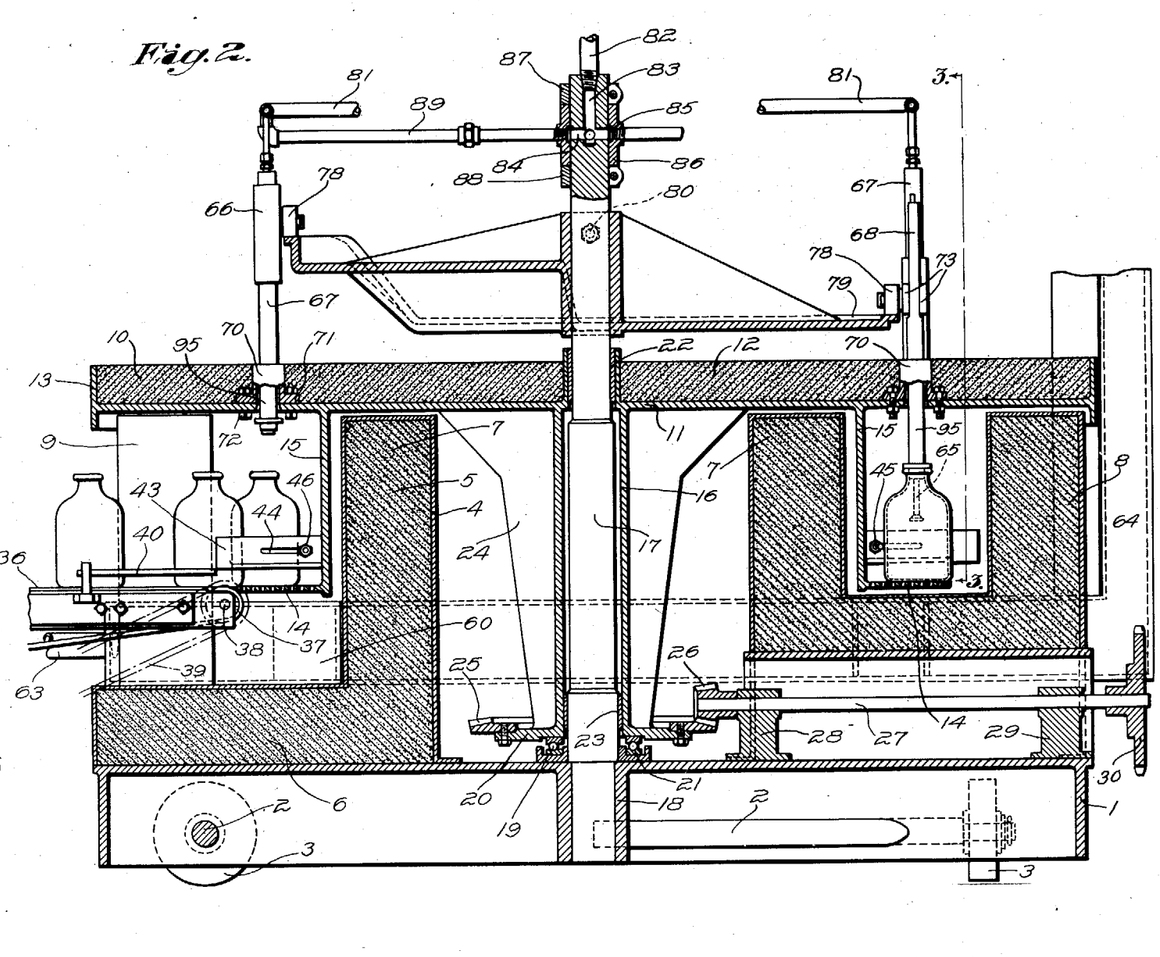
Fig. 2 is a view in vertical section taken substantially on the broken line 2—2 of Fig. 1.

Along one side of the desired path of articles on the conveyor or buck 36, there is a guide member as shown at 40, which is preferably interchangeable and also adjustable as to position and serves merely to prevent the articles moving from the buck in the wrong direction and/or to guide them in the desired path. On the opposite side of the conveyor or buck 36 is a guide member 41, which is also interchangeable and is suitably adjustably secured in position and arranged so that its inner end (at the right as seen in Fig. 1) extends part way along the tunnel in the direction of movement of the ware and tends to move the ware onto the shelves 14 and radially inward thereof, thus assisting in spotting the articles as hereinafter set forth. It will be understood that this guide member 41 is secured at its outer end at 42, so that its inner end is relatively free to move, but is resiliently held in the position shown due to the material of which it is made. The cylindrical shell 15 has secured thereto or integral therewith at positions adjacent to each shelf 14 an arm 43, which extends substantially radially outward therefrom above and in rear of the center of the associated shelf 14. The arms 43 are each provided with an elongated slot 44 at any point of which there may be secured a centering member 45. These members may be formed of an elbow-shaped guide or rod member which is secured as by welding to a second rod member, which is substantially straight and is provided with a threaded stem, which passes through the slot 44 and is provided on either side of the arm 43 with lock nuts 46 as shown in Figs. 1 and 2. The members 45 may thus be secured in desired adjusted positions and are preferably also interchangeable for permitting the substitution of centering members having different configurations.

The operation of the parts just described in moving an article onto the shelves 14 and spotting the article is as follows: each article is moved as shown in Fig. 1 by the conveyor or buck 36 radially inward of the device and to the position of the bottle a, Fig. 1. The conveyor 36 also tends to move the articles further, so that the leading edge thereof may extend slightly over the adjacent shelf 14. At this time, the arm 43 associated with the shelf in question engages the rear side of the article as seen in Fig. 1 and starts moving it in a path generally transversely of the direction of movement of the conveyor 36 and in the direction of the arrow seen at the end of this conveyor upon the adjacent shelf 14, (Fig. 1). The glass articles will then be moved partly upon a stationary shelf 47 arranged around and outside the path of the shelves 14 at the entrance point of the tunnel and will be gradually pushed farther and farther onto the shelf 14 by the resilient inwardly extending end of the guide 41, which is vertically offset with respect to the height of the arms 43. The article will be moved for example through the position of the article at b until finally the innermost end of the guide member 41 will cause the movement of the article into the re-entrant part of the centering guide 45 as shown for the article c, Fig. 1, which is the desired position for the article on the shelf. It will be understood that for adjusting the device within certain limits, adjustment of the positions of the several guides may be sufficient, while the changing of the device from the handling of one size articles to the handling of articles of a materially different size and shape may require the interchanging of the guide members for others of more suitable size and/or shape.

Means are provided for automatically removing the annealed glass articles from the apparatus and conveying them to a desired point, usually where the articles are selected, tested and packed for shipment. For this purpose, there is provided a conveyor disc 48, which is mounted for free rotation about a stationary central vertical shaft 49 and is driven in synchronized time relation with the movements of the other elements of the conveying means heretofore described. For this purpose, the disc 48 may be provided with a beveled gear 50 rigid therewith and meshing with a beveled gear 51 on a transverse shaft 52 which carries a sprocket about which a sprocket chain 53 passes. This sprocket chain also passes about a suitable sprocket on the shaft 32, the drive for which has been previously described.

The rotating disc 48 is mounted adjacent to the path of the shelves 14, as shown in Fig. 1, and means including a stationary guiding member 54 are provided for deflecting the annealed articles from the shelves 14 across a suitable sector-shaped stationary shelf 55 onto the disc 48. The guide member 54 may be disposed in a substantially horizontal plane beneath the path of movement of the arms 43. As shown, this member 54 is carried adjustably and interchangeably by an arm 56 which is adjustably and interchangeably mounted upon the central stationary shaft 49 about which the disc 48 is rotatable. This shaft similarly carries a second arm 57 which adjustably and interchangeably supports a deflecting guide member 58 for moving the articles from the disc 48 onto a buck or conveyor generally indicated at 59, the drive for which is not shown, but which may be assumed to be conventional.

While in the usual circumstances the various conveying means just described will be operated continuously, so that articles will be continuously conveyed through the annealing apparatus, it will be understood that not only all the conveying means which have been described, but also the various other means hereinafter to be described which cooperate with the individual articles are so constructed and arranged that the articles may if desired be moved intermittently, and I contemplate that such movement is to be included in the scope of my invention as defined in the appended claims. The only thing which need be done in effecting this change will be the application of an intermittent driving movement to the drive shaft 32, by which all the moving parts of the apparatus are operated.

Means are provided for supplying heat to the tunnel for limiting the rate of heat dissipation from the outsides of the glass articles passing therethrough. This heat is preferably provided beneath the tunnel by a muffle flue arrangement in which a flue extends below and in good heat transferring relation with the tunnel in a direction in substantial parallelism with the path of the glass articles therethrough. As shown, I have provided a flue 60 extending for the major portion of the way around the device beneath the path of the ware. The flue 60 has an angular portion extending to the outside as illustrated at 61, this portion being provided with an opening 62 into which is directed a current of hot gases, such as will be produced by a flame from a liquid or gaseous fluid fuel burner 63. A stack or other gas conducting means 64 is provided communicating with the opposite end of the flue 60 for conducting gases therefrom.

In the device shown, there are no particular means for controlling the temperature gradient along this flue, but this gradient is controlled by the normal rate of heat dissipation from the gases. I contemplate, however, that if desired some suitable means, such as those shown for example in the Mulholland Patent No. 1,560,481, granted Nov. 3, 1925, may be used for establishing a predetermined or adjustable temperature gradient along the flue and hence in corresponding portions of the tunnel. Also the exhaust flue or passage 64 could communicate with an exhaust fan, as shown in the Mulholland patent, if desired.

I provide means according to my invention for passing a gaseous cooling medium, in the usual case air, into and out of the interiors of the glass articles during their travel through the apparatus as aforesaid for cooling the insides of the articles at a rate and to an extent which will be substantially independent of the rate of cooling or heat dissipation from the outsides thereof. Specifically, I prefer to withdraw air from the center portion of the interiors of the glass articles leaving an aperture at the neck portions for the inflow of atmospheric air to replace that withdrawn, as this cooling action has been found to be more uniform and less severe than the cooling which would be accomplished by the direct application of air under pressure into the articles, although the latter method is to be considered within the scope of the present invention.

Figures 3, 4:
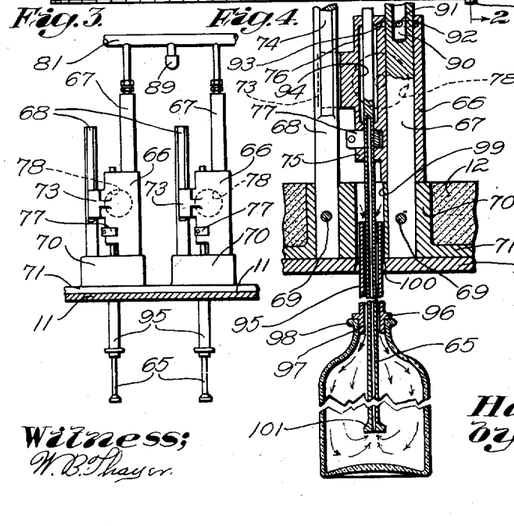
Fig. 3 is a fragmentary view partly in vertical section on the line of 3—3 of Fig. 2 and partly in side elevation, certain portions of the structure being omitted for purposes of clarity.
Fig. 4 is a fragmentary view substantially in vertical section on the line 4—4 in Fig. 1 showing the application of the internal cooling means in operation in respect to a glass article.
Figure 5:
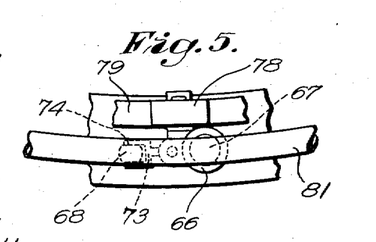
Fig. 5 is a fragmentary plan on an enlarged scale of a portion of the structure shown in Fig. 1 illustrating particularly the construction for supporting and vertically moving the suction nozzles.

As shown, I have provided a plurality of air conducting pipes 65 by which vacuum may be applied to the interiors of the articles after these pipes have been moved down into the interiors substantially to the position in which the pipe 65 is shown in Fig. 4. The pipes 65 are arranged to be carried by means moving with the top 10 of the lehr and one of these pipes is arranged at each of the positions at which an article may be carried upon a bottom plate or shelf 14. Inasmuch, however, as all of these devices are similar, only one will be described.

The pipe 65 is carried by a head 66, which is mounted for movement with respect to the top 10 solely in a vertical direction and upon guide shafts 67 and 68. These shafts are suitably secured as by pins 69 in a socket member 70, which may form a part of an annular ring 71 extending completely around the top 10 as shown and secured as by bolts 72 to the member 11 thereof.

The head 66 is provided with a cylindrical bore receiving the shaft 67 with a fairly air tight fit, and is provided with a bifurcated guiding portion 73 engaging the opposite flattened sides 74 of the shaft 68, as seen in the drawings.

The pipe 65 extends upwardly through a suitable bore in an ear 75 of the head 66 and thence upward through a hollowed-out body portion 76 thereof. Intermediate the body portion 76 and the ear 75, there is provided a clamp 77 which may be secured at any desired position to the pipe 65, so that when it is desired that the pipe 65 be adjusted vertically in respect to the head 66, as to accommodate articles of different heights, this may be accomplished by loosening the clamp 77, adjusting the pipe 65 to the desired height and again tightening this clamp. The clamp may also be loosened when it is desired to interchange the pipe 65, as for use with articles having different size neck openings.

Means are provided for moving the head 66 and thus the pipe 65 carried thereby vertically. For this purpose, each of the heads is provided with a cam roller 78 carried on a horizontally extending radial stub shaft secured thereto and arranged to ride on the upper surface of a stationary cam 79, Fig. 2. This cam is formed upon a large stationary substantial circular member, which is secured as by a clamping bolt 80 to the central stationary column 17 of the apparatus.

Means are provided for supplying vacuum at the desired times to the several pipes 65. For this purpose, each of the shafts 67 projects upwardly to and is connected with an annular pipe 81, this pipe being supported by the shafts 67, thus serving to rigidify the entire structure.

A pipe 82 leading to a suitable source of subatmospheric pressure is connected to a central longitudinal bore 83 in the upper end of the stationary central column 17. This bore communicates through a plurality of transverse bores 84 with an annular chamber 85 formed within a rotating collar 86 sleeved about the column 17. The collar 86 is confined vertically between a pair of stationary clamping collars 87 and 88, which are secured to the column member 17, and is connected by a plurality of radially extending pipes 89 with the annular pipe 81, these radial pipes communicating between the annular chamber 85 and the pipe 81, so that the source of vacuum at all times communicates with the pipe 81. The pipe 81 communicates through a longitudinally extending bore 90 (Fig. 4) in each of the shafts 67 with one or more lateral bores as 91 in this shaft, which communicate with an annular chamber 92 formed in the inside of the bore in the head 66 opposite the lateral bores 91 at the lowermost position of the head. Thus vacuum will be cut off at this point except when the head 66 is at its lowermost position and atmospheric pressure will not be permitted to enter into the vacuum system at other times. The annular groove or chamber 92 communicates through an inclined bore 93 with the hollow chamber 94 in the portion 76 of the head 66 through which the upper end of the pipe 65 passes. The pipe 65 has a longitudinal hole therein which either does not extend completely therethrough as shown or is blocked at its upper end in some suitable manner, there being one or more lateral bores communicating between the inside of pipe 65 and the outside of this pipe at a position therealong which will be within the chamber 94 at all adjusted positions of the pipe 65 with respect to the head 66. Thus at the position of the parts shown in Fig. 4, the vacuum will communicate with the interior of the pipe 65 through the various passages described.

Means are preferably provided for preventing excessive cooling of the neck or finish portions of the articles by the circulation of the cooling medium through the insides thereof as aforesaid. For this purpose, I preferably provide a sleeve member 95 preferably of some suitable metallic material, which loosely surrounds the pipe member 65, but is unattached thereto. This sleeve member has a flange 96 thereon, which is adapted to rest upon the top of the neck portion of the article being treated, and has a depending portion 97, which in the operative position of the sleeve member 95 as shown in Fig. 4 extends down into the article within the neck opening thereof. The portions 96 and 97 of the member 95 are adapted to engage the neck portion of the article in a substantially air-tight manner, so that any air entering the interior of the article as aforesaid must pass intermediate the sleeve member 95 and the pipe member 65 as indicated by the arrows in Fig. 4. Thus the portions 96 and 97 of the member 95 will protect the neck or finish portion 98 of the article from the direct cooling action of the cooling air passed therethrough.

This function is advantageous in that the neck portion is normally cooled to a sufficient extent in the forming process, so that in order that the article be cooled fairly uniformly, a cooling must be positively effected of the body portion of the article to maintain approximately the same rate of cooling as the neck portion with that portion being cooled almost wholly by the normal heat dissipation therefrom. The protecting sleeve in practice is maintained fairly hot by contact with successive glass articles. Excessive cooling of this neck portion, on the other hand, might easily result in overstraining and consequent breakage of this portion. I contemplate that the protecting sleeve here disclosed or some equivalent means may be used not only in protecting the neck portion of an article during the annealing thereof, but also or alternatively during any cooling thereof prior to annealing.

The member 95 passes up through the enlarged aperture 99 formed in the support 70 as shown, the lower end of this aperture having a tapered configuration as shown at 100 in order to guide the upper end of the sleeve member 95 into the aperture 99 if this upper end should be moved below this point.

When the pipe member 65 is raised to move it out of an article under the control of the cam 79 as above set forth, the head 101 at its lower end will engage the lower end portion of the projection 97 and raise the member 95 therewith clear of the article prior to its removal from the annealing device as aforesaid. When the pipe member 65 is lowered to project into the interior of a glass article, the member 95 will be lowered therewith until it engages the neck portion of an article as shown in Fig. 4, after which the pipe member 65 will continue its lowering movement to the position shown in that figure.

Referring now to the form of the invention shown in Figs. 6 to 9 inclusive, wherein I have illustrated a modification of my device and of my method for the annealing of glassware, including the injection thereinto of a predetermined preferably variable quantity of a relatively volatile liquid, the general arrangement of the device, its drive, the conveying means for the articles therethrough, and the means for conducting the articles into and out of the device are substantially the same as or equivalent to those previously described, so that the parts designated by reference characters 1 to 64 inclusive are given the same reference members. It will be understood that these parts correspond to the parts similarly numbered in Figs. 1 to 5 inclusive and previously described herein. In view of this similarity of parts and functions, no further description will be given of this subject matter.

I have illustrated in this form of my invention an additional means for spotting or centering the articles in predetermined positions on the shelves or carrying plates 14. For this purpose, there is provided at each of the article receiving positions a vertically movable sleeve member 102, which is arranged to be moved downward around the neck portion of an article to center it and also to steady it in its desired position during subsequent operations. The member 102 has its lower end portion provided with grooves as shown at 103 for the purpose of permitting the escape of gaseous material from the insides of the articles as hereinafter set forth and also has the lower end intermediate the slots curved outwardly as at 104 to engage the neck portion 105 of an article, which is not in its exactly proper centered position and move it laterally to the desired point at which it is held by the member 102 when located at its lowermost operative position.

The members 102 are mounted for vertical sliding movement in suitable bearing members 106 (Fig. 7), which may form a part of an annular ring 107 suitably secured to the rigid plate-like member 11 of the top 10. Above these bearing members, the sleeve members 102 have vertically adjustably secured thereto collar members 108 each providing an annular groove 109. The adjustment here provided serves to accommodate these members to use with articles of different heights. In the groove 109 is received the outer ball or cylindrical shaped end 110 of a bell crank 111, which is pivoted intermediate its ends at 112 to a bracket 113 secured to an extension of the bearing member 106 as shown. For operating the bell cranks 111 to move the members 102 vertically, the other arm of each of these bell cranks is arranged to be engaged by a push rod 114 slidable in a horizontal and substantially radial bearing 115 and carrying at its inner end a cam roller 116 arranged to engage a stationary cam 117, which is secured as by a collar 118 to the central vertical column 17 of the machine. For holding the cam rollers 116 against the associated cam and for exerting a pull upon the bell cranks 111 tending to move the associated sleeve members 102 downwardly, there are provided tension springs 119 extending between the bell cranks 111 and suitable anchorages fixed to the guide members 115 as shown. Thus the members 102 will be positively lifted by the radial outward movement of the cam rollers 116 under control of the cam 117 and will be resiliently lowered into their operative positions under the control of the tension springs 119.

As above generally set forth, I provide means for injecting a fine stream of a relatively volatile liquid, which may be water, into the interior of each of the articles during its travel through the annealing device. For this purpose there is provided at each of the positions at which an article may be carried in the device, an injecting tube 120 having a suitable nozzle 121 at its lower end. This nozzle is so arranged as to project a very fine stream into the interior of an article under such high pressure that the stream will feather before it comes into contact with the side or bottom walls of the article. For this purpose, the nozzle may have an opening which in size is in the order of magnitude of .003 inch. The tubes 120 are arranged to be in fixed but vertically adjustable positions in substantial axial alignment with the neck openings 122 of the articles, as shown best in Fig. 9. These tubes and the apparatus associated therewith are each similar to the others, so that only one will be described.

The tube 120 is mounted as shown in a valve bushing 123 (Fig. 8), which is in turn threaded into the lower end of a head member 124, the member 124 being suitably vertically adjustably secured as by the use of a split collar 125 and clamping bolts 126 to a stationary vertical guide rod 127 which is mounted rigidly in a suitable socket in the guide member 106 and rigid with the ring 107.

Within the member 124 is formed a displacement chamber 128 forming a part of a displacement pump including a plunger 129, which is operated by means hereinafter to be described. The valve bushing 123 is formed as shown with a bore 130, flow through which is controlled by a ball valve 131 spring pressed to closed position by a small compression spring as shown, which valve is arranged to open under the influence of sufficient pressure within the chamber 128. Fluid such as water may be conducted to the chamber 128 through a lateral bore 132 from a chamber 133 also formed in the member 124. Fluid may be conducted to the chamber 133 through a pipe 134 under control of a ball valve 135 which is likewise spring pressed to closed position by a suitable compression spring as shown. The lower end of the plunger 129 is provided with a reduced diameter stem portion 129a, which is so positioned and of such size that it will project down through the bore 130 to unseat the ball 131, or to prevent the reseating of the same at the lowermost position of the plunger 129. Also as the parts are shown, the lowering movement of the plunger 129 will act as a valve to cut off communication between the chamber 128 and the port or passage 132.

Figures 6, 8, 9:
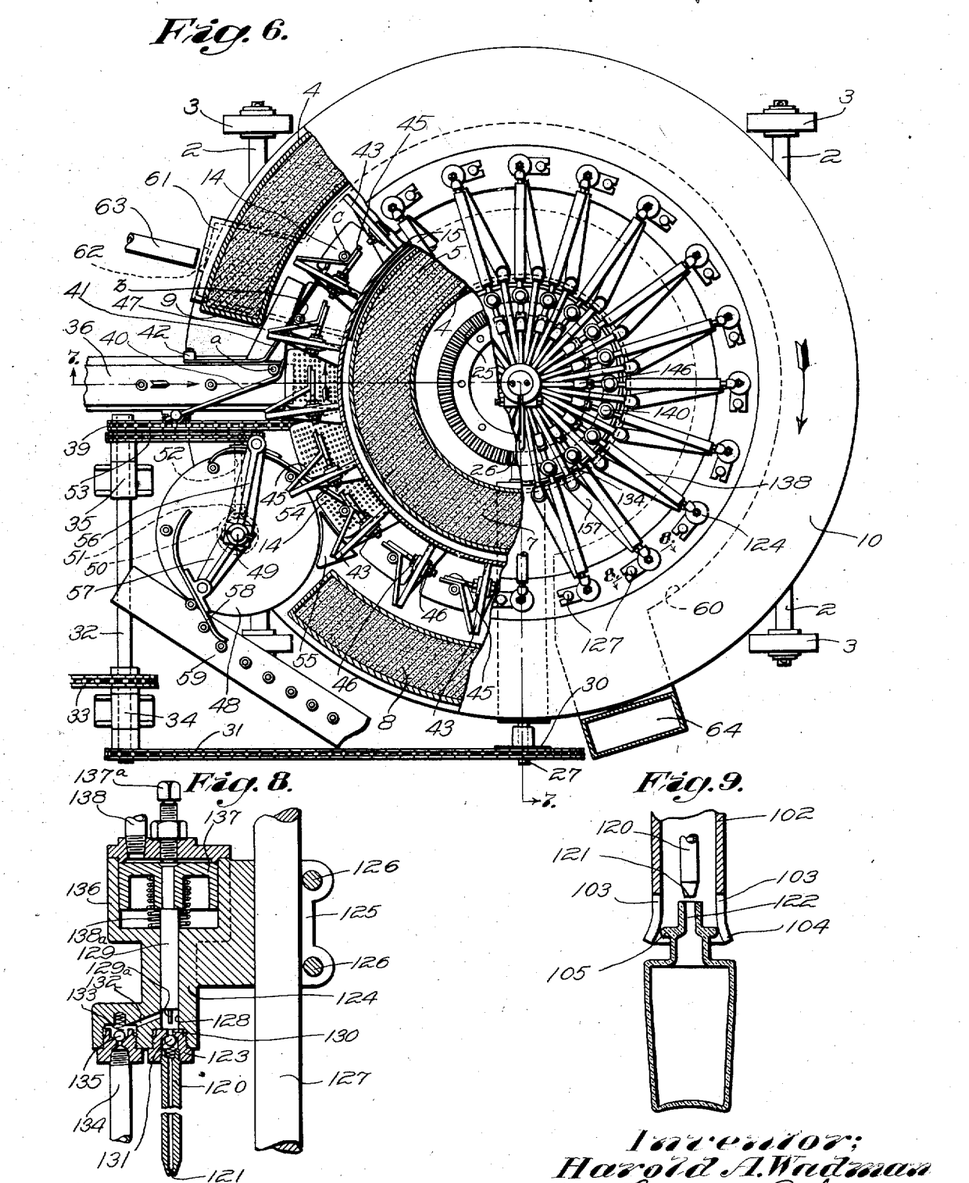
Fig. 6 is a view similar to Fig. 1, but showing a modified form of the invention for carrying on internal cooling with the use of a stream of a volatile liquid.
Fig. 8 is a fragmentary view principally in vertical section taken on the line 8—8 of Fig. 6 and illustrating the liquid injector nozzle and the means for forcing the liquid therethrough.
Fig. 9 is a fragmentary view illustrating the relation of an injector nozzle and steadying means in cooperative relation with a glass article being treated, the view being principally in vertical section.

The operation of the pump shown in Fig. 8 is as follows, starting with the parts in the position shown in the accompanying drawings, in which position the plunger 129 is raised and the chambers 128 and 133 and the passage 132 communicating between them are substantially full of a cooling medium, such as water. The first action is the lowering of the plunger 129. During this action the ball valve 135 remains closed, as the pressure is at no time enough less within the chambers and passage than that within the pipe 134, but that the spring associated with the ball 135 will keep it in closed position. The lowering movement of the plunger 129 forces the liquid out through the tube 120 and nozzle 121 thereof into the article by unseating the ball 131 against the compression of its spring. As soon as the plunger has passed the port opening into the passage 132, all communication between chamber 128 and chamber 133 is closed until the plunger has again been raised to open this port. At the lowermost position of the plunger, the valve ball 131 is positively held off its seat by the reduced stem portion 129a contacting therewith.

At the termination of the supplying of a spray of cooling liquid into the interior of an article, the plunger 129 is immediately raised. This raising action of the plunger causes a partial vacuum beneath it and in the spaces communicating therewith which includes the bore through the tube 120, the ball 131 being maintained off its seat as aforesaid until the plunger 129 has raised a material distance. This will withdraw any liquid remaining in the bore of the tube 120 into the chamber 128 and will positively prevent any one or more drops of liquid as such falling into the interior of an article, which might cause damage thereto. Once the plunger 129 has been raised sufficiently so that the position of the stem 129a permits reseating of the ball 131 under the action of its compression spring, the tube 120 has been substantially emptied, so that there will be no liquid which might drop into the interior of an article as aforesaid. The further upward movement of the plunger will uncover the port to passage 132, which, combined with the vacuum now created by this upward movement, will cause the unseating of the ball valve 135 to fill the chambers with water or other cooling liquid and thus restore the parts to the original condition.

I contemplate that the provision of such a liquid cooling means, including the means hereinabove described for preventing drops of liquid as such falling into an article may be employed, in conjunction with the annealing of articles and/or also to cool articles after they have been discharged from the molds of the machine in which they are formed, as for setting up the articles to prevent their collapse when they are placed upon the conveying means provided.

For operating the plunger 129 to cause the introduction of liquid as aforesaid, I provide a pneumatic cylinder 136 which may also be formed in a part of the member 124 as shown. Within this cylinder is a piston 137, which may be spring pressed toward its uppermost position as by the compression spring 138a as shown and may be forced downward on its power stroke by the admission of pneumatic pressure to the upper end of the cylinder 136 through a pipe 138. The plunger 129 is directly connected to the piston 137 and forms the piston rod thereof. The stroke of the piston is made variable by varying the upper limit thereof by the provision of the adjustable set screw 137a. This screw may be adjusted and locked in adjusted position by the jam nut shown to predetermine the quantity of liquid injected into a glass article in each charge in a variable manner.

Figure 7:
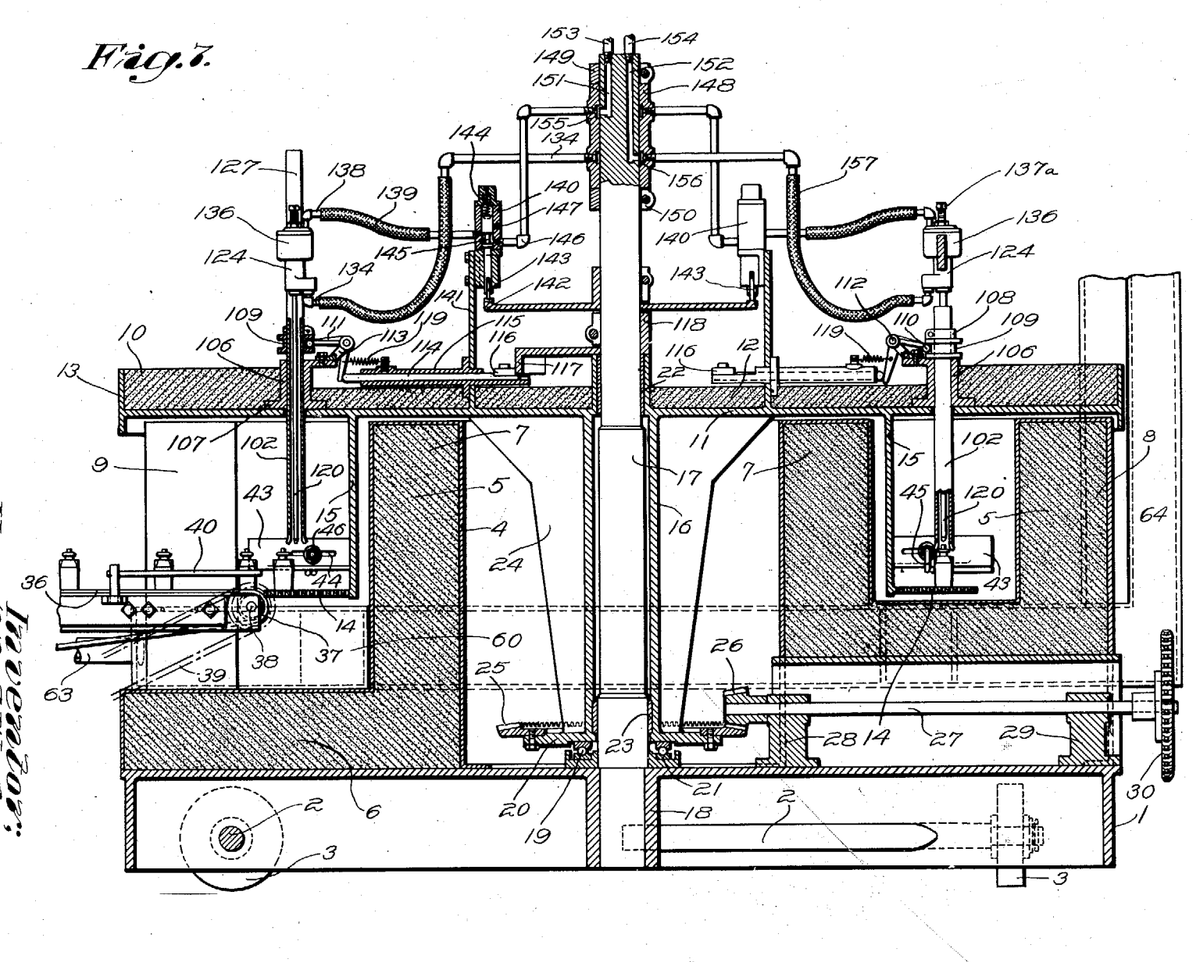
Fig. 7 is a view substantially in vertical section taken on the broken line 7—7 of Fig. 6.

Referring now to Fig. 7, the pipe 138 is shown as having a flexible portion 139 to permit of the vertical adjustment of the member 124 as a whole for the purpose of compensating for articles of different heights as aforesaid. This pipe leads to a valve generally indicated at 140, which is carried by a bracket or shell 141 secured to or integral with the metallic plate member 11 as shown. One of the valves 140 is shown in cross section at the left in Fig. 7. The valves 140 are arranged to be controlled by a stationary cam 142 secured to the central stationary column 17 and engaging a roller 143 at the lower end of the plunger of each of the valves 140, these rollers being held against the cam by suitable compression springs 144 at the upper ends of the plungers. The plunger of each valve has a suitable cutout portion as shown at 145, which is arranged in both positions of the plunger to register with the port to which pipe 138 is connected and also to register at the lower position of the plunger with a pipe 146 and at its upper position with an exhaust opening 147. Thus when the plunger is at its lowermost position, pressure will be supplied from the pipe 146 through the valve to pipe 138 to move the piston 137 downwardly in cylinder 136; while when this pressure is relieved as by the upward movement of the valve plunger connecting the pipe 138 with exhaust port 147 due to a high portion on the cam 142, the piston 137 will be forced upwardly in its cylinder under the control of the compression spring 138a.

I have shown in Fig. 7 a distributor for controlling the supply of both compressed air and the liquid used in annealing, as water, to the device. This distributor comprises a rotary collar 148 sleeved about the central column 17 and to which the pipes 146 are secured for rotating it, this collar being confined between stationary collars 149 and 150 in a predetermined position on the stationary column 17. In this column there are formed bores 151 and 152 extending longitudinally of the column and arranged to be supplied with compressed air and water respectively from pipes 153 and 154. The bore 151 communicates through a lateral bore with an annular groove 155 formed within the rotary collar 148 at the level of the lateral bore and communicating through the several pipes 146 with the several valves 140. The longitudinal bore 152 communicates through a lateral bore with an annular groove 156 in the collar 148 and that in turn communicates through pipes 134 including flexible sections 157 with the liquid inlet valves 135. Thus the annealing liquid, such as water, will be continuously supplied through the pipe 154, the longitudinal bore 152, the lateral bore therefrom, the annular groove 156 and pipes 134 to the several intake chambers of the displacement pumps, while the air pressure for operating the pumps will be continuously supplied through the pipe 153 and the passages and bores described to the several valves. The operation of the apparatus will now be obvious.

I contemplate that the displacement pumps will be so arranged and designed as to inject the liquid into the interiors of the articles under a fairly high pressure, this pressure, the character of the liquid and the size of the orifices in the nozzle members 121 being so co-ordinated as to cause the stream of liquid injected into the articles to feather prior to engaging the side or bottom walls of the articles. I have also provided for preventing any drops of liquid falling into the articles after the pressure injection thereof has ceased. I contemplate that one or more "shots" of liquid may be injected into each article during its course through the apparatus as aforesaid and/or that this process and more or less equivalent apparatus may be used to inject liquid into articles moving intermittently or continuously in a straight path or some other form of path, and also that the process could be carried on advantageously without the use of an insulated and/or heated path.

While I have shown and described but two embodiments of my invention, it will be understood that many changes may be made therein and many of the individual features may have independent utility in various ways including those suggested hereinabove. I do not wish to be limited, therefore, except by the scope of the appended claims, which are to be construed as broadly as the state of the prior art permits.

I claim:

1. The method of cooling articles of hollow glassware while conveying the same from the machine in which they were formed toward the point at which they may be selected and packed, which comprises controlling the rate of heat abstraction from the interiors of such articles independent of the rate of heat dissipation from the exteriors of the articles, and thereby setting up predetermined selected strain conditions in the articles when cooled.

2. The method of treating articles of hollow glassware while conveying the same from the machine in which they were formed toward the point at which they may be selected and packed, which comprises separately controlling the rates of heat abstraction from the interiors and exteriors of said articles, whereby the articles when cooled may have selected predetermined strain characteristics.

3. That method of tempering hollow glass articles, which comprises the steps of limiting the rate of cooling of the outsides of the articles, and independently controlling the rate of abstraction of heat from the insides thereof in coordination with the rate of cooling of the outsides to establish a desired condition of strain in the articles as finally cooled.

4. That method of tempering hollow glass articles, which comprises the steps of limiting the rate of cooling of the outsides of the articles, and independently controlling the rate of abstraction of heat from the insides thereof by causing the introduction into the insides of the articles of a fluid for the removal of heat from the glass to coordinate the relative rates of cooling of the insides and the outsides of the articles to establish a desired condition of strain therein as finally cooled.

5. That method of tempering hollow glass articles, which comprises abstracting heat from the insides of the articles by withdrawing air from points centrally located in the interiors thereof while leaving openings at the necks of the articles for the inflow of air from the atmosphere to replace that which is withdrawn as aforesaid.

6. That method of tempering hollow glass articles, which comprises controlling the rate of abstraction of heat from the insides of the body portions thereof by passing a cooling medium into and out of the insides of the articles to coordinate the rate of cooling of the insides of the articles with the rate of heat dissipation from the outsides thereof to establish a desired condition of strain therein as finally cooled, and concomitantly projecting the neck portions of the articles from the cooling action of said medium thus passed into and out of the articles to prevent too rapid cooling of such neck portions.

7. That method of tempering hollow glass articles, which comprises controlling the rate of abstraction of heat from the insides thereof by introducing predetermined quantities of a liquid into the insides of the articles through the neck openings thereof in a finely subdivided condition to absorb heat from the glass so as to coordinate the rate of cooling of the insides of the articles with the rate of heat dissipation from the outsides thereof to establish a desired condition of strain therein as finally cooled.

8. The method of internally cooling hollow glass articles, which comprises controlling the rate of abstraction of heat from the insides of the body portions thereof by passing a gaseous cooling medium into and out of the insides of the articles, and protecting the neck portions of the articles from the direct cooling action of the gaseous medium passed into and out of the insides of the articles through such neck portions to prevent too rapid cooling of the neck portions during the cooling of the body portions as aforesaid.

9. Apparatus for handling and cooling articles of glassware after the same have been completely formed, which comprises means for conveying the articles as formed from the forming machine to the place at which they may be selected and packed, means effective during at least a portion of the travel of said articles effected by said conveying means for controlling the rate of cooling of the interiors of said articles independently of the rate of cooling of the exteriors thereof, whereby the articles when cooled have desired strain characteristics.

10. Apparatus for handling and cooling hollow glass articles after the same have been completely formed, comprising means for conveying the articles as formed from the forming machine to the place at which they may be selected and packed, means for controlling the rate of heat dissipation from the outsides of the articles during at least a portion of their travel as aforesaid, and other and distinct means for independently controlling the rate of abstraction of heat from the insides of the articles during at least a part of such travel.

11. Apparatus for tempering hollow glass articles, comprising an insulated tunnel, means for conveying the glass articles therethrough, and means for controlling the rate of abstraction of heat from the insides of the articles independently of the rate of heat dissipation from the outsides thereof during at least a portion of their travel through said tunnel.

12. Apparatus for tempering hollow glass articles comprising an insulated tunnel, means for conveying the glass articles therethrough, means for supplying heat to the interior of said tunnel to control the rate of heat dissipation from the outsides of the articles, and other and distinct means for independently controlling the rate of heat abstraction from the insides thereof during at least a portion of their travel through said tunnel.

13. Apparatus for tempering hollow glass articles, comprising an insulated tunnel, means for conveying the glass articles therethrough, a flue extending beneath said tunnel in substantial parallelism with the path of the glass articles therethrough, means for supplying hot gases to one end of said flue, means for conducting gases away from the opposite end thereof, and other and distinct means for independently controlling the rate of heat abstraction from the insides of the articles during at least a portion of their travel through said tunnel.

14. Apparatus for tempering hollow glass articles, comprising means for conveying the bare articles from a forming machine in which they were formed along a predetermined path, and means associated with the conveying means for passing a fluid into and out of the insides of the articles during a portion of their travel along said path to control the rate of heat abstraction from the insides of the articles independently of the rate of heat dissipation from the exposed outsides thereof.

15. Apparatus for tempering hollow glass articles, comprising means for conveying the articles along a predetermined path, means for spotting the articles at particular locations in respect to said conveying means, and means including air conducting pipes extending down into the articles for passing cooling air into and out of the insides of the articles during a portion of their travel along said path to control the rate of heat abstraction from the insides of the articles independently of the rate of heat dissipation from the outsides thereof.

16. Apparatus for cooling hollow glass articles in the manufacture thereof, comprising a pipe smaller in diameter than the neck opening of an article and projectable into the interior thereof through such neck opening, means for projecting said pipe into an article, and means for applying vacuum to said pipe to exhaust air from the inside cavity of the article and cause an inflow of air from the atmosphere into the inside of the article to cool the glass from the inside independently of the rate of cooling of the outside of the article.

17. Apparatus for tempering hollow glass articles, comprising a vertically movable annular sleeve member, means to lower said member down to a position in which it engages the neck portion of a glass article to be annealed in such manner as to make a substantially air-tight joint with such neck portion around said sleeve member with the sleeve portion extending down into such neck portion substantially concentrically thereof, a pipe smaller in outside diameter than the inside diameter of said sleeve member extending therethrough and movable to an operative position in which its lower end is within the inside cavity of the glass article, means to move said pipe to and from its operative position in respect to a glass article as aforesaid, and means for applying vacuum to the inside of the article through said pipe to cause an inflow of air into the article between said sleeve member and said pipe to abstract heat from the inside of the article at a rate independent of the rate of cooling of the outside thereof, while protecting the neck portion of the article from the direct cooling action of the inflowing air by said sleeve.

18. Apparatus for tempering hollow glass articles, comprising a substantially circular insulated tunnel, means for conveying the articles therethrough, means for spotting the articles in predetermined locations on said conveying means, air conducting pipes mounted for movement with said conveying means and projectable into the insides of the articles during their travel through said tunnel, means to move said pipes to and from their positions for cooling the articles, and means for causing a flow of air through said pipes to abstract heat from the insides of the glass articles at a rate independent of the rate of heat dissipation from the outsides thereof.

19. Apparatus for tempering hollow glass articles, comprising a substantially circular insulated tunnel, means for conveying the glass articles therethrough, means for spotting the articles at particular locations on said conveying means, means for supplying heat to the interior of said tunnel to retard the rate of cooling of the glass articles from the outsides thereof, and other means for passing a fluid into and out of the interior cavities of the articles for independently abstracting heat from the insides thereof.

20. Apparatus for tempering hollow glass articles, comprising a substantially circular insulated tunnel, means for conveying glass articles therethrough, means for spotting said articles at particular locations on the conveying means, means for supplying heat to said tunnel to limit the rate of heat dissipation from the outsides of the articles, a pipe arranged for substantially vertical movement at each of the locations at which a glass article may be spotted and movable with said conveying means, means responsive to the movement of said conveying means for moving said pipes between positions in which their lower ends extend into the insides of the articles to be annealed and upper inoperative positions, said pipes when lowered passing freely through the neck openings of the articles, and means responsive to the movement of each pipe substantially to its lower operative position for connecting said pipe with a source of vacuum, whereby vacuum applied through said pipes causes air from around the articles to pass into and out of the interiors thereof to abstract heat from such interiors at a rate independent of the rate of heat dissipation from the outsides of the articles.

21. Apparatus for cooling hollow glass articles in the manufacture thereof, comprising a nozzle aligned axially with the neck opening of an associated glass article, and means for forcing a predetermined quantity of a relatively volatile liquid through said nozzle into the interior of said article under pressure sufficiently high in coordination with the size and character of the orifice of said nozzle as to cause the stream of liquid to feather before contacting with any portion of the glass article.

22. Apparatus for cooling hollow glass articles in the manufacture thereof, comprising means for conveying the articles along a predetermined path, means for spotting the articles in particular locations in respect to said conveying means, a plurality of nozzles movable with said conveying means and cooperable with the articles conveyed thereby respectively, each nozzle being aligned substantially axially with the neck opening of the associated glass article, and means for forcing predetermined quantities of a relatively volatile liquid through said nozzles and into the interiors of the associated glass articles under high pressure during the time the nozzles and articles are aligned with one another as aforesaid.

23. Apparatus for cooling hollow glass articles in the manufacture thereof, comprising a nozzle aligned axially with the neck opening of an associated glass article, automatic means for forcing a quantity of a relatively volatile liquid through said nozzle into the interior of said article under pressure sufficiently high in coordination with the size and character of the orifice of said nozzle to cause the stream of liquid to feather before contacting with any portion of the glass article, and means for adjustably controlling the amount of liquid thus injected into each article.

24. Apparatus for tempering hollow glass articles, comprising means for conveying the articles along a predetermined path, means for spotting the articles in particular locations in respect to said conveying means, a plurality of nozzles movable with said conveying means and cooperable with the articles conveyed thereby respectively, each nozzle being aligned substantially axially with the neck opening of the associated glass article, a pump associated with each of said nozzles for forcing a predetermined quantity of a relatively volatile liquid through the associated nozzle into the interior of the aligned glass article under high pressure, and automatic means controlled by the movement of said conveying means through a predetermined zone in their path of travel for actuating said pumps.

25. Apparatus for tempering hollow glass articles, comprising means for conveying the articles along a predetermined path, means for spotting the articles in particular locations in respect to said conveying means, a plurality of nozzles movable with said conveying means and cooperable with the articles conveyed thereby respectively, each nozzle being aligned substantially axially with the neck opening of the associated glass article, a displacement pump associated with each of said nozzles for forcing a predetermined quantity of a relatively volatile liquid through the associated nozzle into the interior of the aligned glass article under high pressure, a pneumatic cylinder for operating each of said pumps, valves for controlling the admission and exhaust of pneumatic pressure to each of said cylinders, and means for operating said valves in response to movement of said conveying means to move the articles through a predetermined zone in their path of travel.

26. Apparatus for tempering hollow glass articles, comprising means for conveying the articles along a predetermined path, means for spotting the articles in particular locations in respect to said conveying means, other and distinct means moving with said conveying means for accurately centering the articles at said particular locations thereon and for steadying the articles during their movement by said conveying means, means for automatically moving the last named means to and from their article-steadying positions in response to the movement of said conveying means, a plurality of nozzles movable with said conveying means and cooperable with the articles conveyed thereby respectively, each nozzle being aligned substantially axially with the neck opening of the associated glass article, and means for forcing predetermined quantities of a relatively volatile liquid through said nozzles and into the interiors of the associated glass articles under high pressure during the time the nozzles and articles are aligned with one another as aforesaid.

27. Apparatus for tempering hollow glass articles, comprising an insulated tunnel, means for conveying the glass articles therethrough, means for spotting the articles in particular locations in respect to said conveying means, means for supplying heat to said tunnel to limit the rate of heat dissipation from the outsides of the articles passing therethrough, a plurality of nozzles movable with said conveying means and cooperable with the articles conveyed thereby respectively, each nozzle being aligned substantially axially with the neck opening of the associated glass article, and means for forcing predetermined quantities of a relatively volatile liquid through said nozzles and into the interiors of the associated glass articles under high pressure during the time the nozzles are aligned with the glass articles as aforesaid.

28. Apparatus for tempering hollow glass articles, comprising a substantially circular insulated tunnel, means for conveying the articles therethrough, means for spotting the articles in particular locations in respect to said conveying means, a substantially circular flue located below and in good heat transferring relation with said tunnel for supplying heat thereto to limit the rate of heat dissipation from the outsides of the articles, a plurality of nozzles movable with said conveying means and cooperating with the articles conveyed thereby respectively, each nozzle being aligned substantially axially with the neck opening of an associated glass article, a displacement pump associated with each of said nozzles for forcing a predetermined quantity of a relatively volatile liquid therethrough and into the interior of the associated glass article for abstracting heat from the inside thereof, and means operating in response to the movement of said conveying means for operating said pumps to inject the liquid into the articles as aforesaid, whereby the relative rates of cooling of the insides and outsides of the glass articles may be so coordinated as to produce a desired condition of strain in the articles as finally cooled.

29. Apparatus for internally cooling hollow glass articles, comprising an air conducting passage projectable into the interior of an article and having an opening therefrom adjacent to its lower end, a sleeve member arranged substantially concentric with said passage and adapted to engage the neck portion of the article when said passage is at its operative position with its lower end in the interior of an article, said sleeve member at the operative position thereof aforesaid being in substantially air-tight engagement with the neck portion of an article and providing between it and said passage an annular space for the flow of air between these members, said sleeve member projecting downward into the article a material distance so that air flowing through said annular space intermediate said sleeve member and said passage will not come into direct contact with the neck portion of the article, and means for causing a flow of air into and out of the interior of an article and through said passage for cooling the inside of the body portion of the article, while the neck portion is protected by said sleeve member from the direct cooling action of the air thus circulated.

30. Apparatus for internally cooling hollow glass articles, comprising a nozzle adapted to be aligned substantially axially with the neck opening of an associated glass article, means for forcing a predetermined quantity of a relatively volatile liquid through said nozzle into the interior of the article under pressure and in such manner that the stream of the liquid thus injected will feather prior to coming into direct contact with the internal walls of the article, and means operative subsequent to the supplying of the liquid into the article as aforesaid for preventing any drops of the liquid as such dripping from said nozzle into the interior of the associated article.

HAROLD A. WADMAN.

---

CERTIFICATE OF CORRECTION.

Patent No. 2,066,283.   December 29, 1936.

HAROLD A. WADMAN.

It is hereby certified that error appears in the printed specification of the above numbered patent requiring correction as follows: Page 7, second column, line 54, claim 6, for the word "projecting" read protecting; and that the said Letters Patent should be read with this correction therein that the same may conform to the record of the case in the Patent Office.

Signed and sealed this 21st day of February, A. D. 1939.

(Seal)

Henry Van Arsdale.
Acting Commissioner of Patents.

opening of an associated glass article, a displacement pump associated with each of said nozzles for forcing a predetermined quantity of a relatively volatile liquid therethrough and into the interior of the associated glass article for abstracting heat from the inside thereof, and means operating in response to the movement of said conveying means for operating said pumps to inject the liquid into the articles as aforesaid, whereby the relative rates of cooling of the insides and outsides of the glass articles may be so coordinated as to produce a desired condition of strain in the articles as finally cooled.

29. Apparatus for internally cooling hollow glass articles, comprising an air conducting passage projectable into the interior of an article and having an opening therefrom adjacent to its lower end, a sleeve member arranged substantially concentric with said passage and adapted to engage the neck portion of the article when said passage is at its operative position with its lower end in the interior of an article, said sleeve member at the operative position thereof aforesaid being in substantially air-tight engagement with the neck portion of an article and providing between it and said passage an annular space for the flow of air between these members, said sleeve member projecting downward into the article a material distance so that air flowing through said annular space intermediate said sleeve member and said passage will not come into direct contact with the neck portion of the article, and means for causing a flow of air into and out of the interior of an article and through said passage for cooling the inside of the body portion of the article, while the neck portion is protected by said sleeve member from the direct cooling action of the air thus circulated.

30. Apparatus for internally cooling hollow glass articles, comprising a nozzle adapted to be aligned substantially axially with the neck opening of an associated glass article, means for forcing a predetermined quantity of a relatively volatile liquid through said nozzle into the interior of the article under pressure and in such manner that the stream of the liquid thus injected will feather prior to coming into direct contact with the internal walls of the article, and means operative subsequent to the supplying of the liquid into the article as aforesaid for preventing any drops of the liquid as such dripping from said nozzle into the interior of the associated article.

HAROLD A. WADMAN.

---

CERTIFICATE OF CORRECTION.

Patent No. 2,066,283. December 29, 1936.

HAROLD A. WADMAN.

It is hereby certified that error appears in the printed specification of the above numbered patent requiring correction as follows: Page 7, second column, line 54, claim 6, for the word "projecting" read protecting; and that the said Letters Patent should be read with this correction therein that the same may conform to the record of the case in the Patent Office.

Signed and sealed this 21st day of February, A. D. 1939.

Henry Van Arsdale.

(Seal) Acting Commissioner of Patents.

CERTIFICATE OF CORRECTION.

Patent No. 2,066,283.  December 29, 1936.

HAROLD A. WADMAN.

It is hereby certified that error appears in the printed specification of the above numbered patent requiring correction as follows: Page 7, second column, line 54, claim 6, for the word "projecting" read protecting; and that the said Letters Patent should be read with this correction therein that the same may conform to the record of the case in the Patent Office.

Signed and sealed this 21st day of February, A. D. 1939.

Henry Van Arsdale.

(Seal)  Acting Commissioner of Patents.